(12) United States Patent
Smith

(10) Patent No.: US 7,098,301 B1
(45) Date of Patent: Aug. 29, 2006

(54) HIGH PRESSURE FILTER METHOD OF SEPARATING POLYMER SOLIDS AND UNREACTED MONOMER

(75) Inventor: Lawrence C. Smith, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 11/194,015

(22) Filed: Jul. 29, 2005

(51) Int. Cl.
*C08F 6/00* (2006.01)

(52) U.S. Cl. ................. 528/502 A; 528/498; 526/68

(58) Field of Classification Search ............ 528/502 A, 528/498; 526/68
See application file for complete search history.

(56) References Cited

U.S. PATENT DOCUMENTS

| | | | | |
|---|---|---|---|---|
| 3,612,144 A * | 10/1971 | Marcum et al. | ........... | 159/48.2 |
| 4,121,029 A | 10/1978 | Irvin et al. | ........... | 526/64 |
| 4,461,889 A * | 7/1984 | Hanson | ........... | 528/498 |
| 4,740,550 A | 4/1988 | Foster | ........... | 525/52 |
| 5,565,175 A | 10/1996 | Hottovy et al. | ........... | 422/132 |
| 5,597,881 A | 1/1997 | Winter et al. | ........... | 526/348 |
| 6,455,643 B1 | 9/2002 | Harlin et al. | ........... | 526/65 |
| 6,462,150 B1 | 10/2002 | Bitterlich et al. | ........... | 526/68 |
| 6,469,110 B1 | 10/2002 | Harlin et al. | ........... | 526/65 |
| 6,562,914 B1 | 5/2003 | Andtsjo et al. | ........... | 526/64 |
| 2002/0132936 A1 | 9/2002 | Kendrick et al. | ........... | 526/64 |
| 2003/0109651 A1 | 6/2003 | Kufeld et al. | ........... | 526/73 |
| 2004/0136881 A1 | 7/2004 | Verser et al. | ........... | 422/132 |
| 2005/0049333 A1 * | 3/2005 | Buckley et al. | ........... | 523/340 |
| 2005/0095176 A1 | 5/2005 | Hottovy | ........... | 422/131 |

FOREIGN PATENT DOCUMENTS

| | | |
|---|---|---|
| EP | 0 100 550 | 1/1987 |
| EP | 1 344 563 | 9/2003 |

* cited by examiner

*Primary Examiner*—Fred Teskin

(57) ABSTRACT

The present invention provides a method of separating unreacted monomer from a polymerization process effluent stream. The polymerization process effluent stream has at least the following components: unreacted monomer, polymer, and solid fines. The method comprises passing the effluent stream through one or more filters disposed within a vessel at a pressure of from about 150 psig to about 400 psig and thereby obtaining a stream of vapor containing less than about 0.5 weight percent solid fines.

52 Claims, 1 Drawing Sheet

HIGH PRESSURE FILTER METHOD OF SEPARATING POLYMER SOLIDS AND UNREACTED MONOMER

TECHNICAL FIELD OF THE INVENTION

The present invention relates, generally, to the field of separating solid particulates from a fluid stream, more particularly, to a method for separating polymer solids and unreacted monomer using a bag filter under high pressure conditions.

BACKGROUND OF THE INVENTION

In a typical slurry polymerization system, monomer (and possibly co-monomer, liquid diluents, and catalyst) are fed into a continuously stirred reactor. The monomer (and possibly co-monomer) reacts to produce a product effluent containing solid polymer particles of various sizes, liquid diluents (if used), unreacted monomer, and catalyst. The effluent, is removed from the reactor, and typically contains between about 40 to 60 wt % unreacted monomer and/or diluents. For economical operation of this process the unreacted monomer and/or diluents are separated from the polymer solids and then returned to the reactor(s).

U.S. Publication No. 2005/0095176 is hereby incorporated by reference in full. U.S. Publication No. 2005/0095176 describes a conventional method of separating polymer solids from unreacted monomer by first vaporizing at least a portion of the reactor effluent. The withdrawn slurry is passed into a high-pressure flash chamber. After leaving the high-pressure flash chamber, the monomer stream is condensed using a simple heat exchange condenser and recycled into the reactor. However, in this conventional method the monomer stream contains a relatively large amount of residual solid particles. These residual solid particles may contain catalyst that will cause further polymerization and could foul the system.

EP 0100550 is hereby incorporated by reference in full. EP 0100550 describes an alternative conventional method of separating olefin solids from unreacted monomer by first vaporizing at least a portion of the reactor effluent. The solids are removed from the unreacted monomer by passing the reactor effluent through a series of bag filters. The unreacted monomer stream is relatively free of residual particles, however, because of the relatively low operating pressure of the filters the unreacted monomer stream must undergo compression before it can be recycled. Compressors are undesirable in this process as they have relatively high capital expense and operating costs.

Accordingly, there is a need for a process that can separate unreacted monomer from an effluent stream into a relatively pure stream, and does not require compression.

SUMMARY OF THE INVENTION

In an embodiment, the present invention provides a method of separating unreacted monomer from a polymerization process effluent stream. The polymerization process effluent stream has at least the following components: unreacted monomer, polymer, and solid fines. The method comprises passing the effluent stream through one or more filters disposed within a vessel at a pressure of from about 150 psig to about 400 psig and thereby obtaining a stream of vapor containing less than about 0.5 weight percent solid fines. In any embodiment herein, the pressure in the vessel is from about 200 psig to about 300 psig. In any embodiment herein, the pressure in the vessel is from about 220 psig to about 270 psig. In any embodiment herein, the vapor leaving the vessel contains less than about 0.1 weight percent fines. In any embodiment herein, the vapor leaving the vessel contains less than about 0.01 weight percent fines. In any embodiment herein, the method further comprises, pulsing a cleaning gas through the filter, wherein the pressure of the cleaning gas is at least about 20 psig above the pressure in the vessel. In any embodiment herein, the cleaning gas is monomer. In any embodiment herein, the cleaning gas is pulsed through the filter at least about once every five minutes. In any embodiment herein, the cleaning gas is pulsed through the filter at least about once every minute. In any embodiment herein, the method further comprises: condensing the vapor into a liquid without the use of a compressor, and recycling the liquid into the polymerization process. In any embodiment herein, the vapor is condensed in a heat exchanger. In any embodiment herein, the method further comprises: feeding the vapor into a fractionation unit; condensing the vapor into a liquid; and recycling the liquid into the polymerization process. In any embodiment herein, the vessel has an upper portion and a lower portion, and the lower portion is designed to facilitate mass flow of solid particles. In any embodiment herein, the retention time of the solids particles is less than about five minutes.

In another embodiment, the present invention provides a method of separating unreacted propylene from a polymerization process effluent stream. The polymerization process effluent stream has at least the following components: propylene, polypropylene, and solid fines. The method comprises passing the effluent stream through one or more filters disposed within a vessel at a pressure of from about 150 psig to about 400 psig and thereby obtaining a stream of unreacted propylene vapor containing less than about 0.5 weight percent solid fines. In any embodiment herein, the cleaning gas is also propylene. In any embodiment herein, the duration of the pulse of the cleaning gas through the dust collector is at least a tenth of a second. In any embodiment herein, the duration of the pulse of the cleaning gas through the filters is at least about a quarter of a second.

In a still further embodiment, the present invention provides a method of recycling propylene from a polypropylene slurry reactor effluent into a polypropylene slurry reactor. The method comprises vaporizing a portion of the polypropylene slurry reactor effluent; separating the polypropylene slurry reactor effluent into propylene and solids within a vessel containing a plurality of filters, wherein the pressure within the vessel is from about 150 psig to about 400 psig, and wherein the propylene leaving the vessel contains less than about 0.5 weight percent solid fines; condensing the propylene; and recycling the propylene into the polypropylene slurry reactor.

Other features and advantages of the present invention will be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying FIGURE in which.

DETAILED DESCRIPTION OF THE INVENTION

Figure 1:
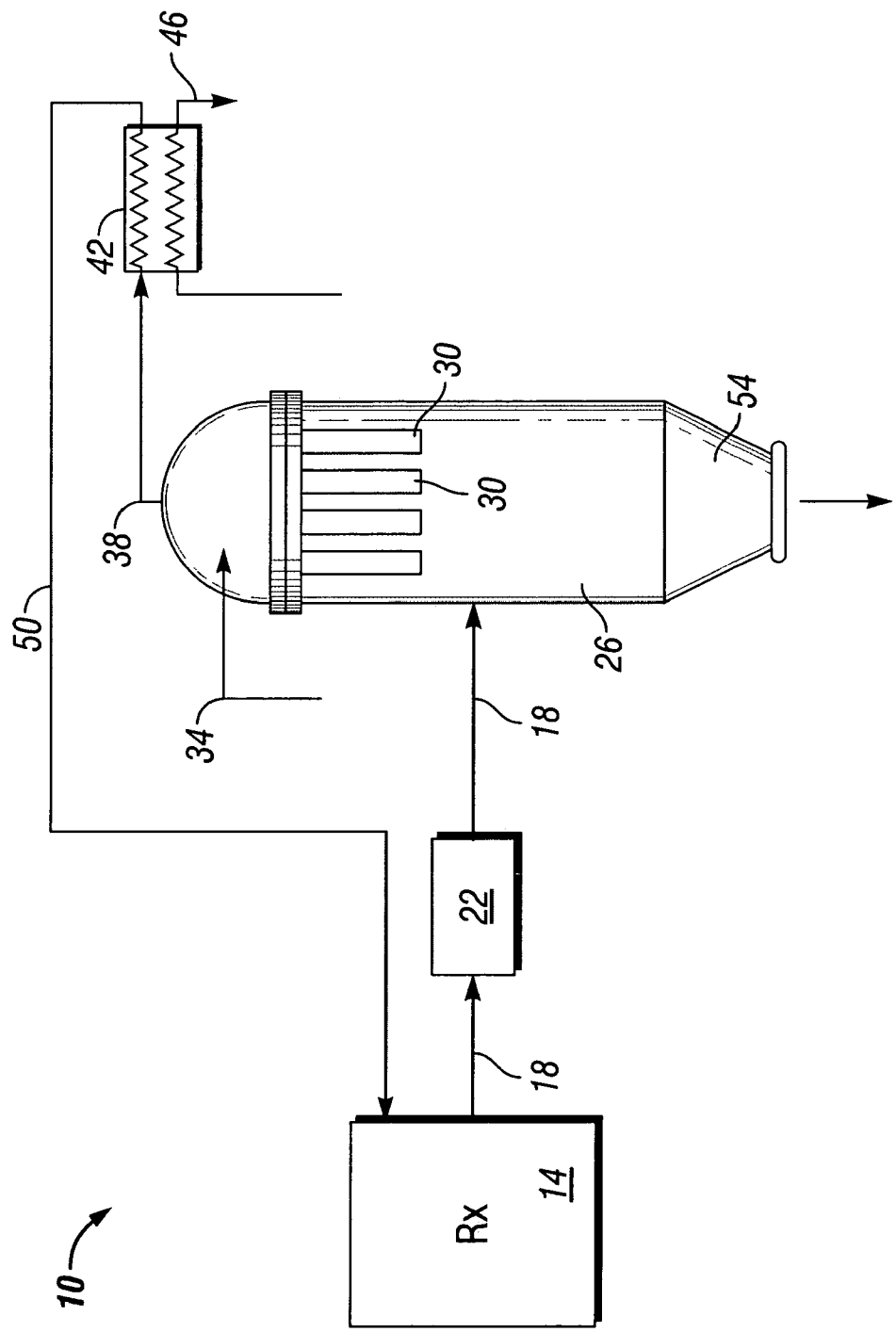
FIG. 1 illustrates a method of separating unreacted monomer from a polymerization reactor effluent stream, in accordance with one embodiment of the present invention.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention and do not limit the scope of the invention.

FIG. 1 illustrates an inventive embodiment of a method for separating unreacted monomer from an effluent stream 18, and recycling the unreacted monomer into a reactor 14. The reactor 14 used according to the present invention may be any reactor known in the art to be used for slurry polymerizations. An example of such a reactor is described in U.S. Pat. No. 5,565,175, which is incorporated by reference in full. Preferably, the reactor 14 is a polypropylene bulk slurry reactor. Polypropylene bulk slurry reactors are operated at a pressure between about 300 psig to about 700 psig, preferably between about 350 psig to about 650 psig, more preferably between about 400 psig to about 600 psig. The temperature of the polypropylene bulk slurry reactor ranges from between about 100° F. to about 220° F., preferably between about 130° F. to about 180° F., most preferably between about 150° F. to about 170° F.

Following the reaction of monomer into polymer, the effluent stream 18 is removed from the reactor 14. The effluent stream 18 contains unreacted monomer, and polymer particles of various sizes including solid fines. Solid fines are defined as particles having an effective diameter less than 100 microns. In an embodiment the effluent stream 18 contains unreacted monomer, polymer, and solid fines having an effective diameter less than 100 microns. In an embodiment the effluent stream 18 contains unreacted monomer, polymer, and solid fines having an effective diameter less than 20 microns. In an embodiment the effluent stream 18 contains unreacted monomer, polymer, and solid fines having an effective diameter less than 5 microns. In an embodiment the effluent stream 18 contains unreacted monomer, polymer, and solid fines having an effective diameter less than 1 microns. In an embodiment the unreacted monomer is propylene and the polymer is polypropylene.

The effluent stream 18 is transferred from the reactor 14 via a conduit and through at least one vaporizer 22. The vaporizer 22 converts at least some of the liquid portion of the effluent stream 18 into a vapor. Most of the solid portion of the effluent stream 18 remains in the solid state. Accordingly, the effluent stream 18 leaving the vaporizer 22 is substantially in two phases: solid and vapor.

The two phase effluent stream 18 is fed into a separation vessel 26. The pressure within the separation vessel 26 is between about 150 psig to about 400 psig, preferably between about 200 psig to about 300 psig, most preferably between about 220 psig to about 270 psig. The temperature within the separation vessel 26 is between about 100° F. to about 200° F., preferably between about 130° F. to about 180° F., most preferably between about 150° F. to about 170° F. The preferred operating pressure and temperature of the separation vessel 26 will depend on the temperature of the cooling stream 46, as will be explained in more detail below.

Within the separation vessel 26, at least a portion of the effluent stream 18 contacts at least one bag filter 30. Preferably the bag filters are standard bag filters such as those provided from the vendor MikroPul located in Chatham, N.J., and other comparable vendors. The bag filters prevent the solid fines from exiting the upper portion of the separation vessel. A purging system 34 may be used to clean the bag filters and prevent plugging. In one embodiment, the purging system 34, forces cleaning gas through the bag filters as required to clear the filter(s) of any plugging. Typical intervals are about once every one to five minutes. The purging system 34 should operate at a pressure of at least about 20 psi above the operating pressure of the separation vessel 26. Preferably, the purging system 34 should operate at a pressure of at least about 50 psi above the operating pressure of the separation vessel 26. Each purge preferably lasts at least about one tenth of a second, more preferably at least about one quarter of a second. The cleaning gas is preferably the same monomer as the unreacted monomer within the effluent stream. For example, if the unreacted monomer is propylene the purging gas is preferably propylene. The preferred number of bag filters 30 used will depend on the flux of the effluent stream 18, the size of the separation vessel 26, and the amount of solid fines within the effluent stream 18.

An unreacted monomer vapor stream 38 is taken off of the upper portion of the separation vessel 26. The unreacted monomer vapor stream 38 contains less than about 0.5 weight percent of fines, preferably less than about 0.1 weight percent of fines, most preferably less than about 0.01 weight percent of fines. The unreacted monomer vapor stream 38 is optionally condensed using a heat exchanger 42. The condensed stream 50 is recycled into the reactor 14, without having to be compressed. In an embodiment the unreacted monomer vapor stream 38 is processed in a fractionation tower (not shown), which includes the heat exchanger 42. In this embodiment, after the unreacted monomer vapor stream 38 exits the fractionation tower (not shown) the liquid stream (not shown) is recycled into the reactor 14.

The cooling stream 46 of the heat exchanger 42 can be air, (in this embodiment, the heat exchanger 42 is an air fin condenser), cooling water or other appropriate cooling medium. Preferably the cooling stream 46 of the heat exchanger 42 is water. For economic reasons, the water is preferably at a temperature approximately equal to that of the external environment. Accordingly, the preferred operating pressure of the separation vessel 26 must be high enough such that the heat exchanger 42 can condense the unreacted monomer vapor stream 38 using the available cooling stream 46. The temperature in vessel 26 must be high enough so that the unreacted monomer is a vapor but not so high as to soften the polymer and cause the system to plug. This effectively limits the maximum pressure of vessel 26.

The lower portion of the separation vessel 54 is preferably designed to facilitate the mass flow of the solid polymer particles including the solid fines. In one embodiment, the lower portion of the separation vessel 54 is made from a polished metal surface having steeply pitched sides at an angle of between about 55° to about 90° from the horizontal, preferably between about 65° to about 90° from the horizontal, and most preferably between about 75° to about 80° from the horizontal. Moreover, the lower portion of the separation vessel 54 is preferably relatively small in diameter. In this manner, the solids hold-up time is less than about 10 minutes, preferably less than about 7 minutes, most preferably less than about 5 minutes. In another embodiment, a level detector is installed in the lower portion of the separation vessel 54 to allow for solids inventory control, and minimize the amount of unreacted monomer vapor leaving the bottom of the vessel with the solid fines.

The embodiments set forth herein are presented to best explain the present invention and its practical application and to thereby enable those skilled in the art to make and utilize the invention. However, those skilled in the art will recognize that the foregoing descriptions have been presented for the purpose of illustration and example only. The description as set forth is not intended to be exhaustive or to limit the invention to the precise form disclosed. Many modifications and variations are possible in light of the above teaching without departing from the spirit and scope of the following claims.

The invention claimed is:

1. A method of separating unreacted monomer from a polymerization process effluent stream having unreacted monomer, polymer, and solid fines, the method comprising: passing the effluent stream through one or more filters disposed within a vessel at a pressure of from about 150 psig to about 400 psig and thereby obtaining a stream of vapor containing less than about 0.5 weight percent solid fines, wherein the effluent stream consists essentially of vapor and solid particles.

2. The method of claim 1, wherein the pressure in the vessel is from about 200 psig to about 300 psig.

3. The method of claim 1, wherein the pressure in the vessel is from about 220 psig to about 270 psig.

4. The method of claim 1, wherein the vapor leaving the vessel contains less than about 0.1 weight percent fines.

5. The method of claim 1, wherein the vapor leaving the vessel contains less than about 0.01 weight percent fines.

6. The method of claim 1 further comprising, pulsing a cleaning gas through the filter, wherein the pressure of the cleaning gas is at least about 20 psig above the pressure in the vessel.

7. The method of claim 6, wherein the cleaning gas is monomer.

8. The method of claim 7, wherein the cleaning gas is pulsed through the filter at least about once every five minutes.

9. The method of claim 8, wherein the cleaning gas is pulsed through the filter at least about once every minute.

10. The method of claim 1 further comprising:
(a) condensing the vapor into a liquid without the use of a compressor, and
(b) recycling the liquid into the polymerization process.

11. The method of claim 10, wherein the vapor is condensed in a heat exchanger.

12. The method of claim 1 further comprising:
(a) feeding the vapor into a fractionation unit;
(b) condensing the vapor into a liquid; and
(c) recycling the liquid into the polymerization process.

13. The method of claim 1, wherein the vessel has an upper portion and a lower portion, and the lower portion is designed to facilitate mass flow of solid particles.

14. The method of claim 13, wherein the retention time of the solids particles is less than about five minutes.

15. A method of separating unreacted propylene from a polymerization process effluent stream having unreacted propylene, polypropylene, and solid fines the method comprising: passing the effluent stream through one or more filters disposed within a vessel at a pressure of from about 150 psig to about 400 psig and thereby obtaining a stream of unreacted propylene vapor containing less than about 0.5 weight percent solid fines, wherein the effluent stream consists essentially of vapor and solid particles.

16. The method of claim 15, wherein the pressure in the vessel is from about 200 psig to about 300 psig.

17. The method of claim 15, wherein the pressure in the vessel is from about 220 psig to about 270 psig.

18. The method of claim 15, wherein the vapor leaving the vessel contains less than about 0.1 weight percent fines.

19. The method of claim 15, wherein the vapor leaving the vessel contains less than about 0.01 weight percent fines.

20. The method of claim 15, further comprising, pulsing a cleaning gas through the filter, wherein the pressure of the cleaning gas is at least about 20 psig above the pressure in the vessel.

21. The method of claim 20, wherein the cleaning gas is monomer.

22. The method of claim 20, wherein the cleaning gas is pulsed through the filter at least about once every five minutes.

23. The method of claim 21, wherein the cleaning gas is pulsed through the filter at least about once every minute.

24. The method of claim 15 further comprising:
(a) condensing the vapor into a liquid without the use of a compressor, and
(b) recycling the liquid into the polymerization process.

25. The method of claim 24, wherein the vapor is condensed in a heat exchanger.

26. The method of claim 15 further comprising:
(a) feeding the vapor into a fractionation unit;
(b) condensing the vapor into a liquid; and
(c) recycling the liquid into the polymerization process.

27. The method of claim 15, wherein the vessel has an upper portion and a lower portion, and the lower portion is designed to facilitate mass flow of solid particles.

28. The method of claim 27, wherein the retention time of the solid particles is less than about five minutes.

29. A method of recycling propylene from a polypropylene slurry reactor effluent into a polypropylene slurry reactor comprising:
(a) vaporizing a portion of the polypropylene slurry reactor effluent, such that the reactor effluent consists essentially of vapor and solid particles;
(b) separating the polypropylene slurry reactor effluent into propylene and solids within a vessel containing a plurality of filters, wherein the pressure within the vessel is from about 150 psig to about 400 psig, and wherein the propylene leaving the vessel contains less than about 0.5 weight percent solid fines;
(c) condensing the propylene; and
(d) recycling the propylene into the polypropylene slurry reactor.

30. The method of claim 29, wherein the pressure within the vessel is from about 200 psig to about 300 psig.

31. The method of claim 29, wherein the pressure within the vessel is from about 220 psig to about 270 psig.

32. The method of claim 29, wherein the propylene vapor leaving the vessel contains less than about 0.1 weight percent fines.

33. The method of claim 29, wherein the propylene vapor leaving the vessel contains less than about 0.01 weight percent fines.

34. The method of claim 29, further comprising, pulsing a cleaning gas through the filters, wherein the pressure of the cleaning gas is at least about 20 psig above the pressure of the vessel.

35. The method of claim 34, wherein the cleaning gas is also propylene.

36. The method of claim 34, wherein the cleaning gas is pulsed through the filters at least about once every five minutes.

37. The method of claim 34, wherein the cleaning gas is pulsed through the filters at least about once every minute.

38. The method of claim 34, wherein the duration of the pulse of the cleaning gas through the dust collector is at least a tenth of a second.

39. The method of claim 34, wherein the duration of the pulse of the cleaning gas through the filters is at least about a quarter of a second.

40. The method of clam 34, wherein the cleaning gas is at least 50 psig above the pressure of the vessel.

41. The method of claim 29, wherein the vessel has an upper portion and a lower portion, and the lower portion is designed to facilitate mass flow of solid particles.

42. The method of claim 41, wherein the retention time of the solids particles is less than about five minutes.

43. The method of claim 29, wherein step (d) is effected directly after step (c) without further processing.

44. The method of claim 29, wherein the propylene is condensed in a heat exchanger before being recycled back to a polymerization process without being subjected to further compression.

45. A method of separating unreacted monomer from a polymerization process effluent stream having unreacted monomer, polymer, and solid fines, the method comprising: passing the effluent stream through one or more filters disposed within a vessel at a pressure of from about 150 psig to about 400 psig and thereby obtaining a stream of vapor containing less than about 0.5 weight percent solid fines, and pulsing a cleaning gas through the filter, wherein the pressure of the cleaning gas is at least about 20 psig above the pressure in the vessel.

46. The method of claim 45, wherein the cleaning gas is monomer.

47. The method of claim 45, wherein the cleaning gas is pulsed through the filter at least about once every five minutes.

48. The method of claim 45, wherein the cleaning gas is pulsed through the filter at least about once every minute.

49. The method of claim 45, further comprising:
(a) feeding the vapor into a fractionation unit;
(b) condensing the vapor into a liquid; and
(c) recycling the liquid into the polymerization process.

50. The method of claim 49, wherein the retention time of the solids particles is less than about five minutes.

51. The method of claim 45, wherein the cleaning gas is propylene.

52. The method of claim 45, wherein the cleaning gas is at least 50 psig above the pressure of the vessel.

* * * * *